US010071450B2

(12) United States Patent
Gerber et al.

(10) Patent No.: US 10,071,450 B2
(45) Date of Patent: Sep. 11, 2018

(54) TURBINE PART REPLACING APPARATUS

(71) Applicant: ANSALDO ENERGIA SWITZERLAND AG, Baden (CH)

(72) Inventors: Heinz Gerber, Baden (CH); Davide Aratori, Nussbaumen (CH); Daniel Seng, Busslingen (CH); Valentin Stenz, Remetschwil (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 225 days.

(21) Appl. No.: 15/066,968

(22) Filed: Mar. 10, 2016

(65) Prior Publication Data
US 2016/0263715 A1 Sep. 15, 2016

(30) Foreign Application Priority Data

Mar. 12, 2015 (EP) .................................. 15158898

(51) Int. Cl.
F01D 25/28 (2006.01)
B23P 19/04 (2006.01)
F23R 3/60 (2006.01)

(52) U.S. Cl.
CPC .......... B23P 19/042 (2013.01); F01D 25/285 (2013.01); F23R 3/60 (2013.01);
(Continued)

(58) Field of Classification Search
CPC ........ B66F 1/00–1/08; B66F 3/00–3/30; B66F 3/44; B66F 3/46; B66F 5/00–5/04; B66F 7/00; B66F 7/06; B66F 7/0608; B66F 7/0625; B66F 7/065–7/0683; B66F 7/08–7/22; B66F 9/00; B66F 11/00;
(Continued)

(56) References Cited

U.S. PATENT DOCUMENTS 5,816,367 A * 10/1998 Lilja .................... F01D 25/285
187/244
5,921,075 A 7/1999 Shimoyama et al.
(Continued)

FOREIGN PATENT DOCUMENTS

CN 201843650 5/2011
EP 0800892 10/1997

OTHER PUBLICATIONS

European Search Report dated Aug. 18, 2015, issued by the European Patent Office in the corresponding European Patent Application No. 15158898.5 (8 pages).

Primary Examiner — Jun Yoo
(74) Attorney, Agent, or Firm — Buchanan Ingersoll & Rooney PC

(57) ABSTRACT

A turbine part replacing apparatus for moving a combustor of an industrial gas turbine from and to a mounting port of the gas turbine is disclosed, the apparatus including a mobile frame with a moving mechanism for substantially horizontal translation motion on the ground, a vertically extendable arm attached to and extending from said mobile frame, and a carriage attached to the extendable arm such that the carriage may be moved vertically with respect to the mobile frame. Moreover, the turbine part replacing apparatus is adapted for receiving the combustor in the carriage and for vertically moving the received combustor by the extendable arm from and to the mounting port.

18 Claims, 8 Drawing Sheets

(52) U.S. Cl.
CPC ...... *F05D 2220/32* (2013.01); *F05D 2230/68* (2013.01); *F05D 2260/02* (2013.01); *F05D 2260/30* (2013.01)

(58) Field of Classification Search
CPC ............... E04G 1/18–1/22; E04G 1/24; E04G 2001/242–2001/02; F01D 25/28; F01D 25/285; F01D 25/246; F23R 3/60; F23R 2900/00017; F23R 2900/00019; F05D 2220/32–2220/323; F05D 2230/68; F05D 2230/80; F05D 2230/70; F05D 2230/60; F05D 2230/64; Y10T 29/4932; Y10T 29/49323; Y10T 29/49318; Y10T 29/49234; Y10T 29/49718; Y10T 29/49815; Y10T 29/49819; Y10T 29/49238; Y10T 29/49998; Y10T 29/53913; Y10T 29/53961; Y10T 29/53974; Y10T 403/64; F02C 7/20; B23Q 3/00; B23Q 3/005; B23Q 3/007; B23Q 3/02; B23Q 3/04; B23Q 3/062; B23Q 9/00; B23Q 16/00; B23Q 3/18–3/186; B23Q 7/00; B23Q 7/005; B23Q 7/05; B23Q 9/0028; B23Q 9/0042; B23Q 9/005; B23Q 9/0064–9/0085

See application file for complete search history.

(56) References Cited

U.S. PATENT DOCUMENTS

| | | | |
|---|---|---|---|
| 6,485,247 B1* | 11/2002 | Groves | B66F 7/20 |
| | | | 180/125 |
| 2003/0183451 A1 | 10/2003 | Huang | |
| 2013/0081404 A1* | 4/2013 | Baldischweiler | F01D 25/243 |
| | | | 60/796 |
| 2015/0316197 A1* | 11/2015 | Morey | B62B 3/02 |
| | | | 280/30 |
| 2016/0376927 A1* | 12/2016 | Mogle, II | B25B 11/02 |
| | | | 29/283 |

* cited by examiner

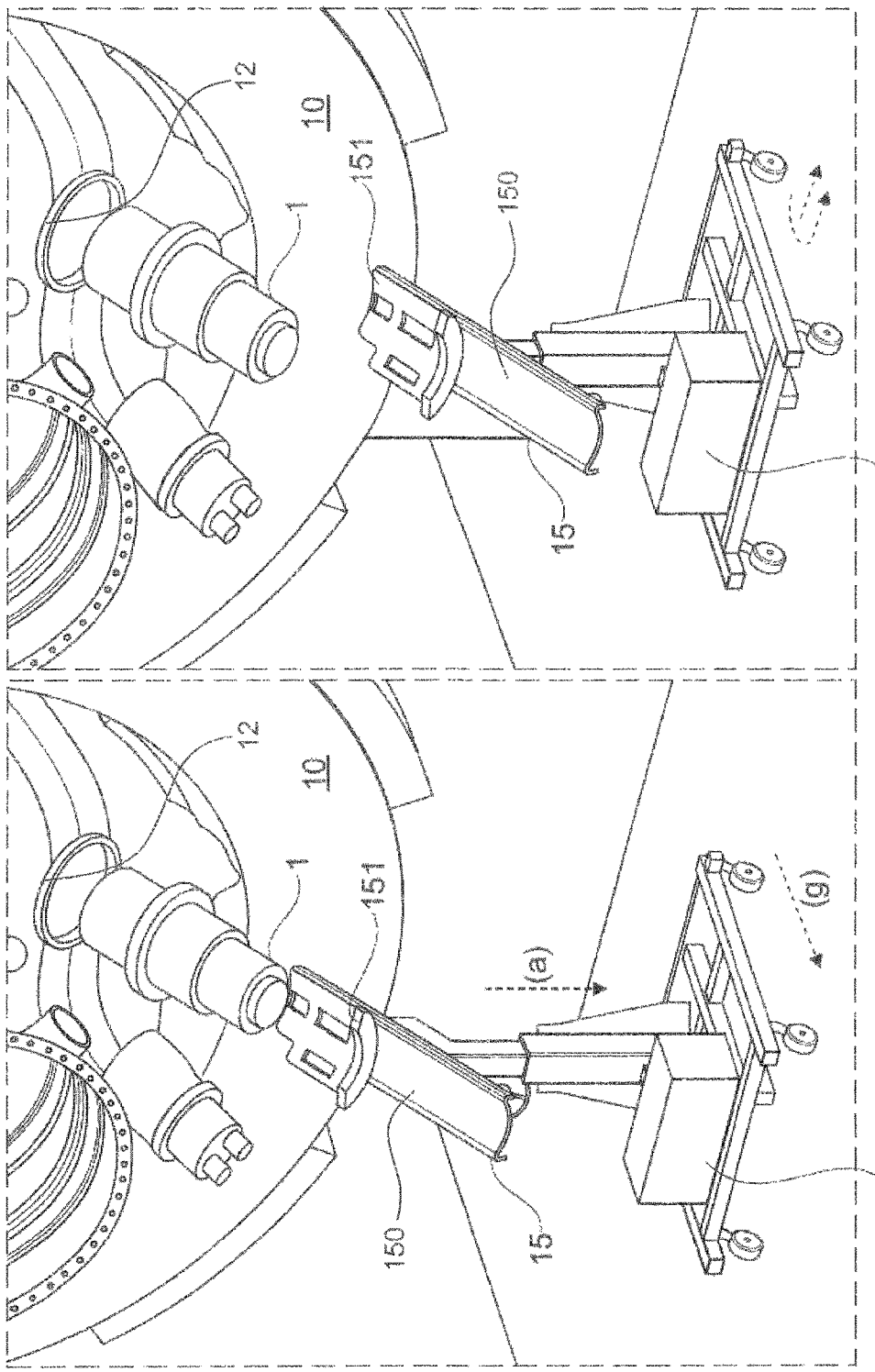

TURBINE PART REPLACING APPARATUS

TECHNICAL FIELD

The present invention relates to a turbine part replacing apparatus usable for assembling or disassembling combustors and/or sequential liners or the like of a gas turbine. Moreover, the present invention relates to a method of replacing turbine parts of a gas turbine.

PRIOR ART

Large industrial gas turbines are typically equipped with a plurality of combustors that are fastened at equal intervals but individual orientations on an annular combustor assembly arranged around and attached to a casing of a gas turbine. The combustors are inserted into mounting ports and releasably flanged to the combustor assembly. As the combustors or other turbine parts like the sequential liner require regular maintenance, these parts have to be demounted and remounted from time to time.

It is known to replace combustors of the gas turbine by means of a scaffold that is to be assembled around the gas turbine. A user may then operate an overhead crane to place a sling over one of the combustors for replacing it. This technique has, however, the draw back that it is difficult to reach combustors that are arranged in the lower half of the gas turbine.

Other prior art methods for replacing combustors of a gas turbine, such as the one disclosed in U.S. Pat. Nos. 5,921,075 and in 5,911,680, use annular rails arranged fixedly around the periphery of the gas turbine and next to the combustors. A carriage that runs and turns on said rail is used for replacement of the combustors, one at a time. These replacement systems are, however, heavy, bulky, expensive, and have to be attached to the casing which takes a lot of time.

SUMMARY OF THE INVENTION

It is therefore an object of the present invention to provide an improved turbine part replacing apparatus.

This object is achieved by the turbine part replacing apparatus according to claim 1. Accordingly, the object is attained by a turbine part replacing apparatus for moving a combustor and/or sequential liner of an industrial gas turbine from and to a mounting port of the gas turbine, the apparatus comprising:

a mobile frame with a moving mechanism for substantially horizontal translation motion on the ground;

a vertically extendable arm (also called beam or telescopic beam) attached to and extending from said mobile frame; and a carriage attached to said extendable arm such that the carriage may be moved vertically with respect to the mobile frame.

The turbine part replacing apparatus is adapted for receiving said combustor and/or sequential liner in said carriage for vertically moving said received combustor and/or sequential liner by means of said extendable arm from and to said combustor mounting port.

Accordingly, the present invention is based on the insight that a turbine part replacing apparatus may be designed by means of an extendable arm, wherein, the arm is attached at one end to a mobile base frame and has attached to its other end a carriage that is in vertical direction by means of said arm and in other directions by means of further motion mechanisms allowing for translation and pivot motions such a to achieve the desired orientation of the carriage to receive or to deliver a combustor and/or sequential liner from or to a designated mounting port.

The construction is particularly advantageous for mounting or demounting of combustors and/or sequential liners in the lower half of the gas turbine, where it is difficult to access the ports by means of an overhead crane device. Moreover, the turbine part replacing apparatus according to invention is highly mobile and accurate, independent, comparatively light, and efficient in use as it is not necessary to attach it to the gas turbine. Furthermore, it is stable and strong enough to support the large weight of typical combustors of an industrial gas turbine. An efficient replacement is particularly desired as the turbine down time shall be minimized in order to reduce costs.

Accordingly, the turbine part replacing apparatus is designed to support the full weight of the combustor and/or sequential liner during the (de)mounting procedure. Moreover, the apparatus design allows for a safe handling of the heavy combustor having often a weight of more than one ton and therefore complies with EHS standards.

The carriage is designed as a cross piece that is moveably attached to the extendable end portion of the arm. Moreover, the carriage may be specifically designed to carry the sequential liner and/or a combustor.

In some embodiments, said extendable arm is a telescopic beam moveable along a vertical motion. The telescopic beam design provides a particularly compact and sturdy construction.

In some embodiments, the extendable beam is actuated by means of a spindle, preferably placed within an interior space of the beam. Accordingly, in some embodiments, said extendable arm comprises at least one first spindle for actuating said extendable arm to vertically move said carriage, wherein both said extendable arm and said first spindle preferably have a four stage design. Preferably, said extendable arm is adapted to move over a vertical distance of at least 1 meter, preferably of at least 3 meters, 5 meters, or 10 meters or even more, depending on the specific requirements.

In some embodiments, the carriage comprises a first pivoting mechanism wherein the carriage is attached to the extendable arm such as to be pivotable along a first pivot motion about a first pivot axis by means of said first pivot mechanism, the first pivot axis extending horizontally and perpendicular to a longitudinal direction of the carriage. This allows orienting the carriage optimally for receiving or laying down a combustor and/or a sequential liner.

In some embodiments, the carriage comprises a sledge for placement of the combustor and/or sequential liner on the carriage, the sledge being arranged on a first surface of the carriage through a sliding device such that the sledge is moveable in a sliding motion relative to said carriage along a longitudinal direction of the carriage and/or perpendicularly to the longitudinal direction of the carriage. This allows a proper orientation of the carriage. The sledge is preferably placed on low friction guides bearing against a top surface of the carriage.

In some embodiments, said sliding device comprises a first sliding mechanism with at least one second spindle and a thrust block, said thrust block being translatable along the second spindle and being attached to the sledge such that the sledge is moveable along a translation motion parallel to said second spindle along the longitudinal direction of the carriage. This allows a vertical fine motion to accurately sliding the combustor and/or liner into or out of the turbine casing.

Further adjustments of the radial/angular position of the carriage may be enabled by further motion mechanisms as follows.

In some embodiments, the top wall surface of the carriage is concave such that a sideways sliding motion of the sledge on the first surface perpendicular to the longitudinal direction of the carriage is a second pivot motion about a second pivot axis parallel to the longitudinal direction of the carriage, wherein the sliding device comprises a second sliding mechanism for shifting said carriage on the first surface along the second pivot motion. This pivot motion allows a fine motion to accurately position the turbine part with respect to the radial position about the longitudinal direction of the carriage. This second sliding mechanism may be implemented by using a plain bearing construction, wherein the moving part is shifted on a bearing surface that is concave. As the radial orientation varies significantly with the mounting port location, different carriage parts and/or sledges may be used in order to meet the motion requirements for all mounting ports. Accordingly, the present invention also provides a kit of parts comprising different carriage parts and/or sledges, see below.

Preferably, a low friction bearing element is placed between the sledge and the bearing surface, whilst the relative shifting motion may be imposed by a threaded rod that attached to one of the sledge and the carriage whilst pushing away the other one. Two threaded push rods may be placed at opposite positions such as to push the sledge with one push rod in one direction and to push it back with the other push rod. Alternatively, the threaded rod may be adapted for pushing and pulling action.

In some embodiments, the carriage comprises a third sliding mechanism, wherein the carriage is attached to the extendable arm such as to be translatable in a translation motion along an axis extending horizontally and perpendicularly to the longitudinal direction of the carriage. This fine motion allows a translational movement relative to the extendable arm or the ground without moving the mobile frame.

The third sliding mechanism may be a mechanism that shifts the entire carriage, i.e. it shifts the carriage on the extendable arm. Additionally or in the alternative, the third sliding mechanism may also shift sledge relative to the carriage. In both bases, threaded rods may be used that may be actuated by the used to shift the carriage on the arm and/or the sledge on the carriage.

In some embodiments, the turbine part replacing apparatus further comprises a measurement device for measuring a rotational position of the carriage, the measurement device being adapted for measuring the rotational position about two horizontal rotational axes that are oriented angularly, preferably perpendicularly, to one another, wherein the measurement device preferably comprises a double bubble level. This allows the constant monitoring of the position of the moved turbine part.

In some instances, at least one, preferably two guide pins for reception in corresponding slots are arranged on the turbine part and on the casing of the gas turbine such as to allow for monitoring the rotational position of the turbine part about a vertical. The pin/slot arrangement may also be vice-versa, i.e. slot in turbine part, pin on turbine casing. Preferably, the pins are arranged on the turbine part, preferably such that they extend substantially horizontally therefrom, as then the visibility of the pins and therefore the monitoring of the rotational position about a vertical is improved. The two guide pins may also guide the (de) mounting motion to some extent while being inserted in said slots.

Here, it is also conceivable to additionally or alternatively use another measurement device such as a laser position system or the like.

In some embodiments, the mobile base frame comprises rolling members for rolling on the ground.

In some embodiments, said rolling members are wheels, preferably at least three, more preferably four or more wheels, and wherein said wheels are arranged in a triangular or in a rectangular, preferably in a square arrangement. The wheels may be twin wheels.

In some embodiments, at least one wheel, preferably two neighboring wheels or all wheels rotatable about a vertical rotation axis.

Thereby, rotational motions about a vertical axis are possible and a mobility of the apparatus is improved.

In some embodiments, the turbine part replacing apparatus has at least one drive, preferably at least one electrical, pneumatic, hydraulic, or other motor for driving the different parts of the turbine part replacing apparatus, such as the spindles, the motion mechanism, and/or the rolling members.

In some embodiments, the apparatus may be designed such that the arm, preferably including the spindle and the carriage, may be disassembled such that the apparatus may be compactly stored or shipped.

Since the combustors and/or liners are typically arranged circumferentially around the axis of the turbine, the radial orientation of the turbine part may vary by up to 180 degrees. Accordingly, in order to meet this requirement, a set of carriages or carriage parts (such as the sledge, see below) may be provided, wherein the user choses the appropriate carriage configuration before moving the corresponding turbine part.

Accordingly, it is also an aspect of the present invention to provide a kit of parts including a turbine part replacing apparatus and a plurality of carriages or carriages parts, in particular sledges, such that, depending on a location of a mounting port on the gas turbine and turbine part replacing apparatus with an appropriate carriage configuration chosen from the kit of parts may be assembled.

Another aspect of the present invention is a method of moving a combustor and/or sequential liner of an industrial gas turbine from and to a mounting port of the gas turbine, comprising the steps:

(a) determining the absolute attachment position of the combustor on said gas turbine;

(b) using the turbine part replacing apparatus according to invention for moving said combustor and/or sequential liner.

The method may include the step of arranging guide pins on the turbine part or the casing for guiding the turbine part during the movement.

In some embodiments, the method comprises that the absolute attachment position of the combustor and/or liner is determined by means of the measurement device as mentioned above, wherein the measurement device is adapted for measuring the rotational position about to two horizontal rotational axes that are oriented angularly, preferably perpendicularly, to one another, the measurement device being preferably a double bubble level, wherein, at least one, preferably two guide pins are arranged on the combustor and/or liner or on the casing of the gas turbine for reception in corresponding slots in a the casing of the gas turbine or in the combustor and/or liner, the two guide pins being preferably a further guiding and/or measurement device for measuring the rotational position with respect to a vertical axis.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 1) through a second sliding mechanism for pivoting the sledge relative to the carriage;

FIG. 1) through third sliding mechanism for sliding motion of the sledge;

FIG. 11 shows the apparatus with the sledge being in extended position, while the telescopic beam is collapsing and the base frame is moved away from the combustor;

FIG. 12 shows the apparatus in park position;

DESCRIPTION OF PREFERRED EMBODIMENTS

Some preferred embodiments are described in context of a replacement of a combustor 1. It is to be understood that also a sequential liner may be replaced.

Figure 1:
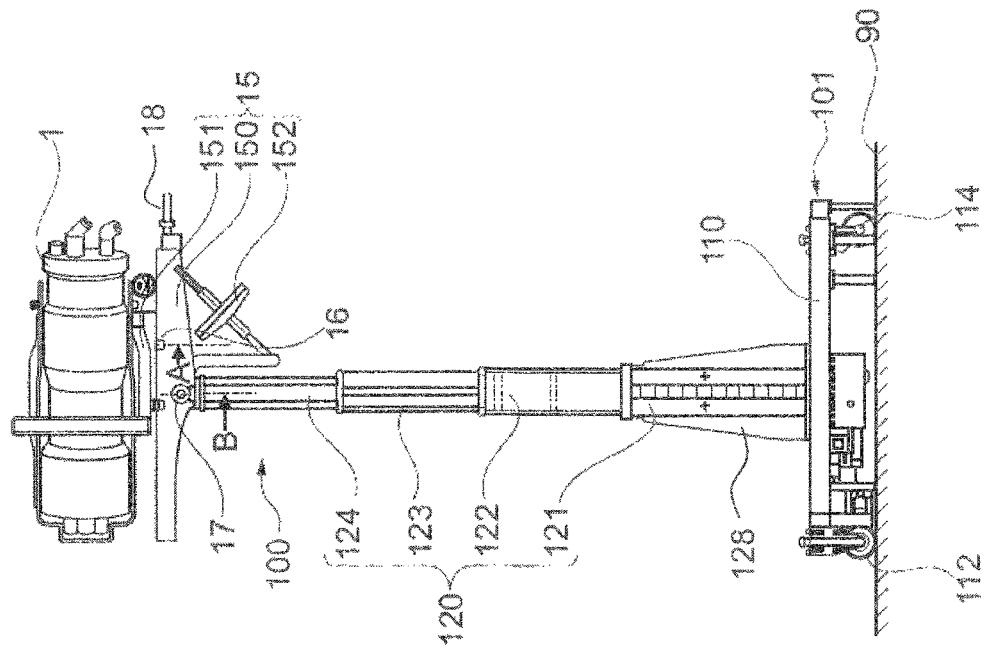
FIG. 1 shows a side view of a preferred embodiment of the turbine part replacement apparatus according to invention with a carriage supporting a sledge on which a combustor is arranged.
Figure 2:
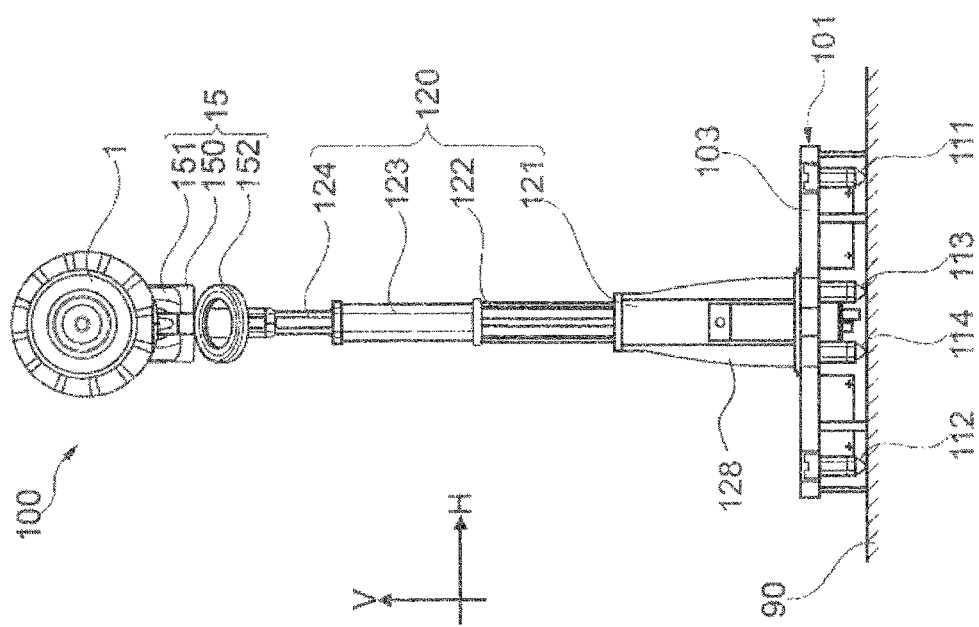
FIG. 2 shows in a front view the turbine part replacement apparatus according FIG. 1.

FIG. 1 shows, in a side view, a preferred embodiment of the turbine part replacement apparatus 100 loaded with the combustor 1. FIG. 2 shows a front view of said apparatus 100 according to FIG. 1.

Figure 3:
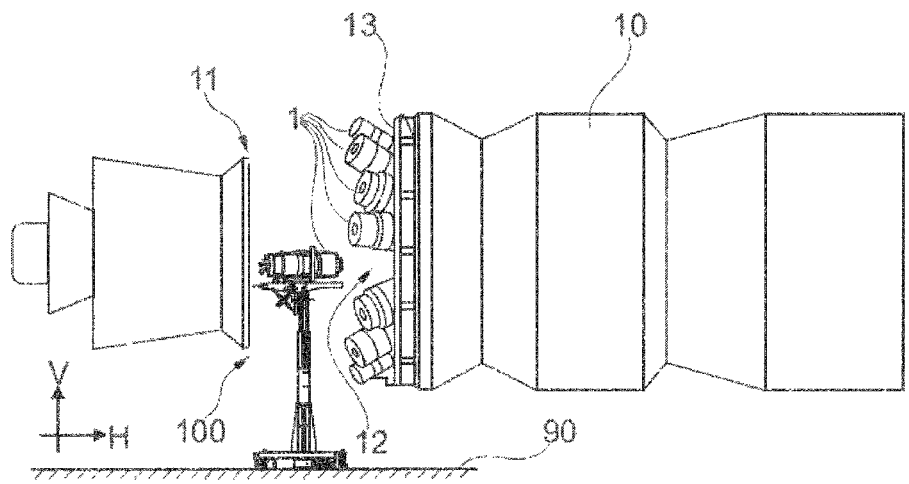
FIG. 3 shows the turbine part replacement apparatus according to FIGS. 1, 2 in a service zone of an industrial gas turbine.

FIG. 3 shows the turbine part replacement apparatus 100 standing vertically on a horizontal ground 90 in a service zone 11 of an industrial gas turbine 10. The horizontal and vertical directions H, V are indicated by respective arrows. The turbine part replacement apparatus 100 is loaded with one combustor 1, combustor 1 having been removed from (or being delivered to) an empty mounting port 12.

Other combustors 1 are arranged next to the empty mounting port 12 and around the gas turbine 10 defining a plurality of combustor operation location. The mounted combustors 1 are flanged into an annular combustor assembly 13 provided with the plurality of circumferentially arranged mounting ports 12.

FIGS. 1 and 2 show the apparatus 100 in extended position; in contrast, FIG. 12 shows the apparatus 100 in park position. The apparatus 100 comprises a vertical telescopic beam 120 with four telescopic stage modules 121-124 that may be telescopically shifted into one another. At a distal end of the beam 120, i.e. away from the base frame 101, is arranged a carriage 15 including a load-specific sledge 151, a carriage structure 150, and a first pivot mechanism 152 for pivoting the carriage 15. Furthermore first, second, and third sliding mechanisms 16, 17, and 18 are arranged such that the carriage 15 may be moved and pivoted as explained herein.

Figure 7:
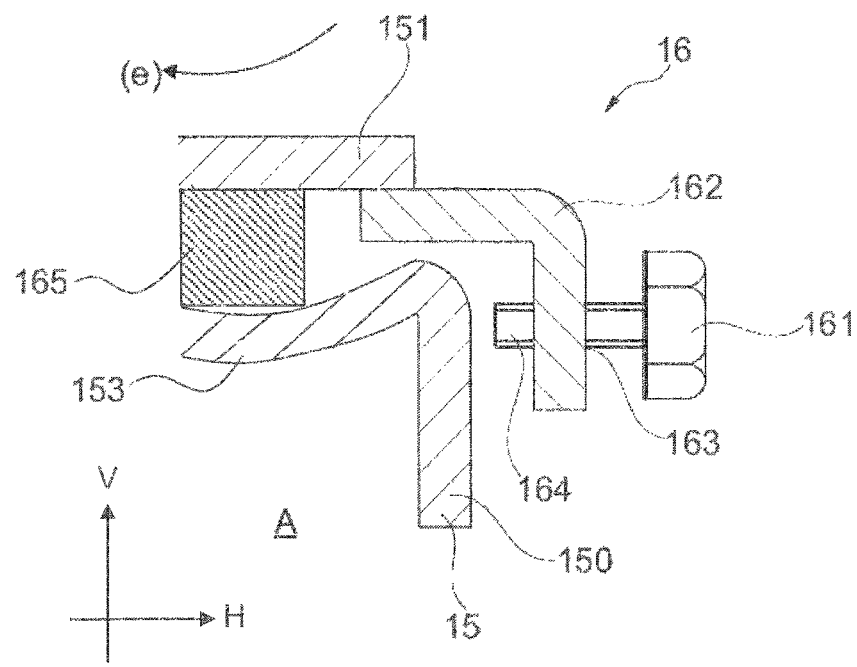
FIG. 7 shows schematically a cross section along A (cf.

The sledge 151 is arranged on low friction guides 165 that are bearing against the carriage 15 (cf. FIG. 7). Thereby, the sledge 151 is movable in any direction on a concave top wall 153 of the carriage 15 (cf. FIG. 7). Moreover, the sledge 151 is specifically designed to receive the specific turbine part in a form-fit. Accordingly, depending on the turbine part to be moved and on the turbine part's final orientation, the design of the sledge 151 may be adapted to provide the apparatus 100 with the required range of motion to receive or deliver the turbine part appropriately.

The turbine part may be secured to the sledge 151 by means of bolts and/or at least one ratchet strap.

The proximal stage module 121 is attached to the horizontally extending base frame 101 by means of vertical reinforcing rips 128 that are arranged circumferentially attached around the proximal stage module 121.

The further stage modules 122-124 are guided in one another wherein each further stage module 122-124 is extending into the proximally neighboring stage module. Thereby, a compact and stiff vertical lifting assembly is provided.

The modules 121-124 are hollow elements, wherein a four stage telescopic first spindle 126 is arranged within the hollow beam 120 for actuation of said beam 120, i.e. for extending or retracting said beam 120. The spindle design is advantageous as it minimizes the overall dimensions of the lifting features. The compact construction also reduces a risk of collisions with surrounding equipment around the gas turbine 10.

Accordingly, the telescopic feature may be a combination of two components: a telescopic spindle and a telescopic hollow beam. Each stage of the spindle is consecutive to the precious. The spindle is in charge for carrying the axial load. The beams are accurate structural components which carry all the other stresses coming from the carriage. Linear guides may provide straight and low friction shifting of the beams. Dedicated lubrication and maintenance may be performed both on the beams and on the spindle. The leading stage of the spindle may point to the ground and may be supported by a trust bearing.

Alternatively, the actuation of the telescopic beam 120 may be done hydraulically, wherein hydraulic cylinders are integrated into the modules 121-124.

Each structural module 121-124 is equipped with strong high precision linear guides in order to ensure the structural integrity of the beam 120 and the required accuracy of the lifting motion while maneuvering heavy loads such as the combustor 1.

By means of the vertically extendable and retractable telescopic beam 120, the apparatus 100 may be used to deliver mounting ports 12 at different heights.

As explained, the apparatus 100 may be adapted to the specific requirement, i.e. one uses a designed sledge 151 designed complementary to the moved turbine part, while a number of modules 121-124 of the beam 120 may be adjusted to the situation as well. Accordingly, on the one hand, if the lifting heights are low as it is a small gas turbine 10 or as only turbine parts in low heights have to be moved, the number of modules 121-124 may be reduced to two stage modules 121,122. On the other hand, if increased lifting heights are necessary, all stage modules 121-124 or a beam 120 with even more than four stage modules may be used. The number of spindle stages may therefore be adjusted accordingly.

In the proximal stage module 121 is integrated a control unit with a control panel 1210 that is accessible from outside for a user to control the movements of the apparatus 100. The control panel 1210 includes control elements comprising an emergency stop and an on/off switch panel. The control panel 1210 preferably comprises a display showing at least an elevation of the carriage in real time.

Preferably, the control unit may be controlled by the user being in safe distance, i.e. the user may have a remote control device.

The base frame 101 (see below) carries the weight of the beam 120, the carriage 15, and the load, e.g. the combustor 1. The base frame 101 stabilizes and secures the entire structure and is designed mobile such that the apparatus 100 may be translated on the ground 90.

The mobility of the base frame 101 is provided by rolling members 111-114, the members being twin wheels.

Figure 4:
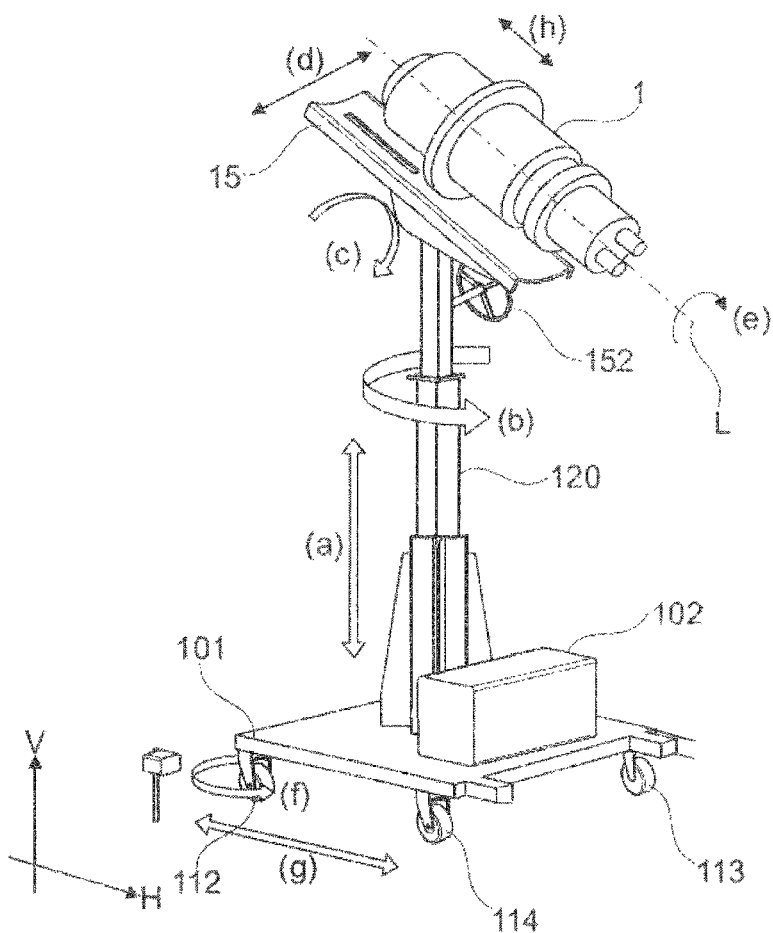
FIG. 4 shows in a perspective view the turbine part replacement apparatus according to FIGS. 1-3 indicating the different motion options; moreover a mobile base frame of the apparatus is shown, the base frame having a square arrangement of wheels.

The wheels 111-114 may be arranged in a triangular configuration (cf. FIG. 3) or, in another embodiment, in a square arrangement (cf. FIG. 4).

Some of the wheels 11-14 are free spinning; some of them are driven by motors 115, the motors 115 being preferably electrical motors, in particular of the type Truma Mover®. A rolling speed is adjustable and fine movements within millimeter accuracy can be performed. The lifting speed and any other motion is adjustable and adapted for precise movements within accuracy of ±1 millimeter.

FIG. 4 shows the apparatus 100 in a perspective view. In the following, the motion options of the apparatus are described, including the fine motion options for accurately orienting the carriage during (de)mounting of the turbine part.

Firstly, the apparatus 100 may move its carriage 15 vertically along vertical motion (a). For carrying out this vertical motion (a), the telescopic beam 120 may be armed out or in by actuating the telescopic mechanism. A range of motion may be, e.g., 1 meter to 15 meters, wherein, depending on the number of stage modules 121-124 used the maximum height is 2 times to 5 times the minimum height.

Secondly, the apparatus 100 may be rotated about the longitudinal axis of the beam 120. This first rotation motion (b) may be achieved through the mobile base frame 101 with its rotation rolling members 111-114. Accordingly, the base frame 101 may be rotated on the ground 90 such as to rotate the beam 120 about its longitudinal axis. This first rotation motion (b) may include rotation up to 360 degrees.

Thirdly, the base frame 101 may be rolled on its rolling members on the ground 90 along a translational motion (g).

Fourthly, a first pivot motion (c) of the carriage 15 about a vertical axis perpendicular to L may be carried out under the control of the first pivot mechanism 152 (see below). This first pivot motion (c) allows adjusting the inclination of the carriage 15 in the direction of its longitudinal axis L. The carriage 15 may be pivoted out of its horizontal position by up to 75 degrees, preferably up to 60 degrees, up to 50 degrees. The pivot mechanism 152 may also allow pivoting the carriage 15 along the first pivot motion (c) in both directions out of the horizontal position.

Fifthly, the carriage 15 may be translated along a horizontal motion (d) by means of a third sliding mechanism 17 (see below). The horizontal motion (d) is directed along a horizontal axis perpendicular to the longitudinal axis L of the carriage 15. The range of motion may here be up to 50 millimeters, preferably up to 30 millimeters or less.

Sixthly, the carriage 15 may be pivoted along a second pivot motion (e) that is controlled by the second sliding mechanism 16 (see below). This second pivot motion (e) allows shifting the sledge 151 on the carriage 15 such that the sledge 151 is pivoted about an axis parallel to the longitudinal axis L of the carriage 15.

Seventhly, the sledge 151 may be translated on the carriage 15 along a translational motion (h) parallel the longitudinal axis L of the carriage 15. Thereby, the sledge 151 may be moved between a retracted and an extended position. The translational motion (h) is controlled by a first sliding mechanism 18 (see below).

Finally, some of the wheels (in this embodiment wheels 111, 112) may be rotatable along a rotational motion (f) (see below).

A combination of the all or any of the above mentioned motions may be carried out simultaneously or consequently.

FIG. 7 shows schematically a cross section A (cf. FIG. 1) through a second sliding mechanism 16 for pivoting the sledge 151 relative to the carriage 15. At a periphery edge of the sledge 151 is arranged an engagement member 162 that is basically an L profile such that one leg extends vertically along the side wall 150 of the carriage 15 while the other leg extends substantially parallel to the concave top wall 153. In the vertical leg of engagement member 162 is provided a threaded recess 163, the recess 163 being a through hole, into which a threaded bolt of a screw 161 engages. The bolt protrudes with a free end 162 towards the side wall 150 of the carriage 15. Upon rotating the screw head, the bolt may be translated, in FIG. 5, to the left with respect to the engagement member 162. The sledge 151 is bearing against a bearing element 165 that is provided on a concave top section 153 of the outer top wall of the carriage 15. The concave top wall 153 of the carriage has a part cylindrical shape, the cylinder axis being parallel to the longitudinal axis L of the carriage 15. Due to the fixed connection between the engagement member 162 and the sledge 151, the sledge 15 is shifted, on the bearings 165, to the right as the screw 161 is screwed into the threaded recess 163 pushing away the engagement member 162 from the vertical part of the carriage wall 150.

Due to the concave shape of the top wall section 153 of the carriage wall 150, the sliding motion of the sledge 151 on the carriage 15 is a pivot motion along the direction (e), i.e. a pivot motion about the longitudinal axis L of the carriage 15.

Figure 8:
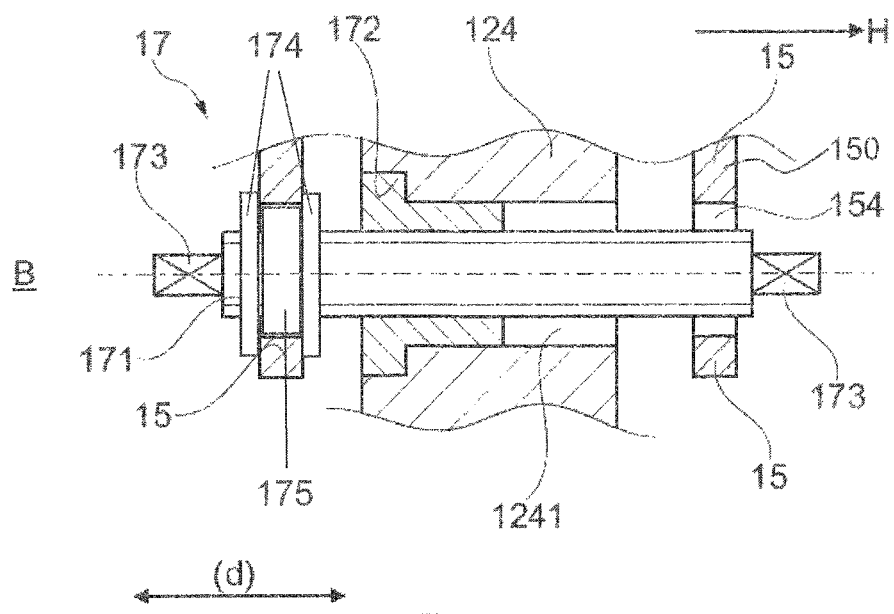
FIG. 8 shows schematically a cross section along B (cf.

FIG. 8 shows schematically a cross section B (cf. FIG. 1) through a third sliding mechanism 17 for sliding motion of the sledge 151 arranged on the carriage 15. The third sliding mechanism 17 comprises a screw 171 that extends through the distal end of the distal stage module 124 of the beam 120. The module 124 is provided with a horizontal through opening 1241 into which a threaded sleeve 172 is inserted. This threaded sleeve 172 meshes with the screw 171. The screw 171 further extends through recesses 154 in the wall 150 of the carriage 15. The screw 171 has tapered end portions 173. The tapered end portions 173 may be provided on the outside with heads (not shown) that protrude over the recesses 154. The screw further comprises two plates 174 which radially extend over the sides of a wall 150 of the carriage 15 thereby fixing the relative position of the carriage 15 to the screw 171 with respect to the direction of the axial extension of the screw which is the direction of motion d. for easier rotation of the screw 171 a disk 175. Upon rotation the screw 171, the screw 171 translates in the sleeve 172 such that the carriage 15 may be shifted to the left or to the right. Accordingly, through activating the third sliding mechanism 17 a horizontal translation of the carriage 15 along the screw 171, i.e. along the motion (d) in FIG. 4, may be carried out.

Figure 9:
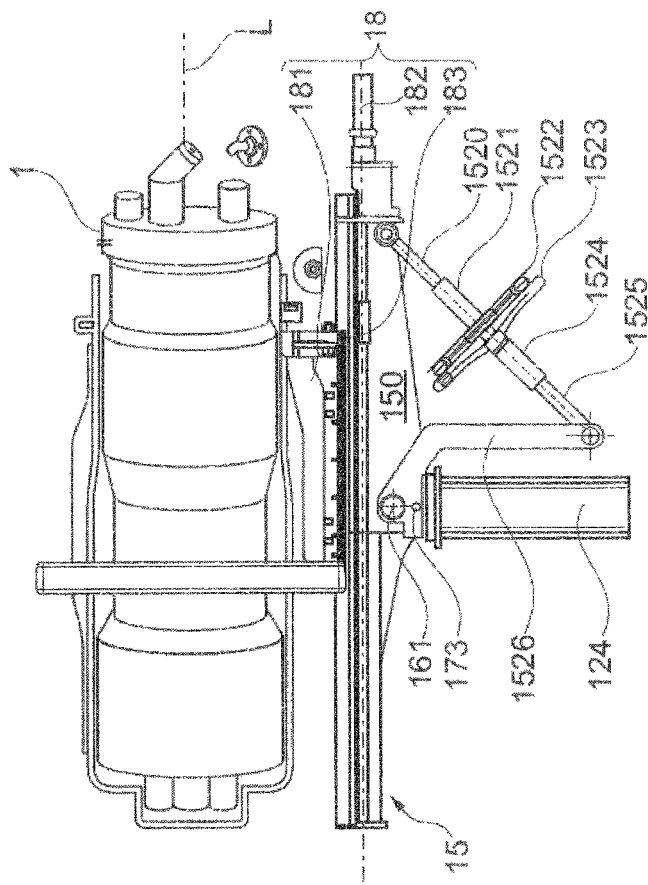
FIG. 9 shows a detail of the carriage with the sledge.

FIG. 9 shows the first pivoting mechanism 152. The carriage 15 is pivotably arranged on the beam module 124, wherein the pivot axis is horizontal and perpendicular to the longitudinal axis L of the carriage 15. In order to control the pivot motion (c), the first pivoting mechanism 152 includes a bracket 1526 that extend from said pivot axis along the distal beam module 124 in order to provide leverage to an extension mechanism arranged between a free bottom end of the bracket 1526 and an end portion of the outer wall 150 of the carriage 15. Said free bottom end of the bracket 1526 and said end portion of the outer wall 150 are connected to one another by means of threaded rods 1520, 1525 and threaded cylinders 1521, 1524. Said threaded rods 1520 translate into or out of said threaded cylinders 1521, 1524 upon rotating a hand actuation 1522 or a chain actuator 1523. Thereby, a distance between said free bottom end of the bracket 1526 and an end portion of the outer wall 150 may be changed, whereupon the pivoting motion (c) about the first pivot axis occurs.

Moreover, FIG. 9 shows the first sliding mechanism 18. On the carriage 15 is arranged the sledge 151 which is moveable along the L direction, i.e. along the translation motion (h). The first sliding mechanism 18 comprises a second spindle 181 which extends in the longitudinal direction L along the carriage 15. The second spindle 181 may be a self-breaking spindle. On said threaded spindle 181 is arranged a thrust block 183 which is fixedly attached to the sledge 151. The second spindle 181 is rotatable by hand or, additionally or in the alternative, by means of a motor 182 provided on the carriage 15. Upon rotation the second spindle 181 by hand or by the motor 182, the sledge 151 translated on said thrust block 183 along the spindle 181 and may be brought in extended to deliver or receive a turbine part from the mounting port 12.

The motor 182 is preferably a pneumatic motor operated by remote control valves for allowing a smooth and precise fine positioning of the combustor 1, the combustor 1 being loaded onto the sledge 151.

Figure 5:
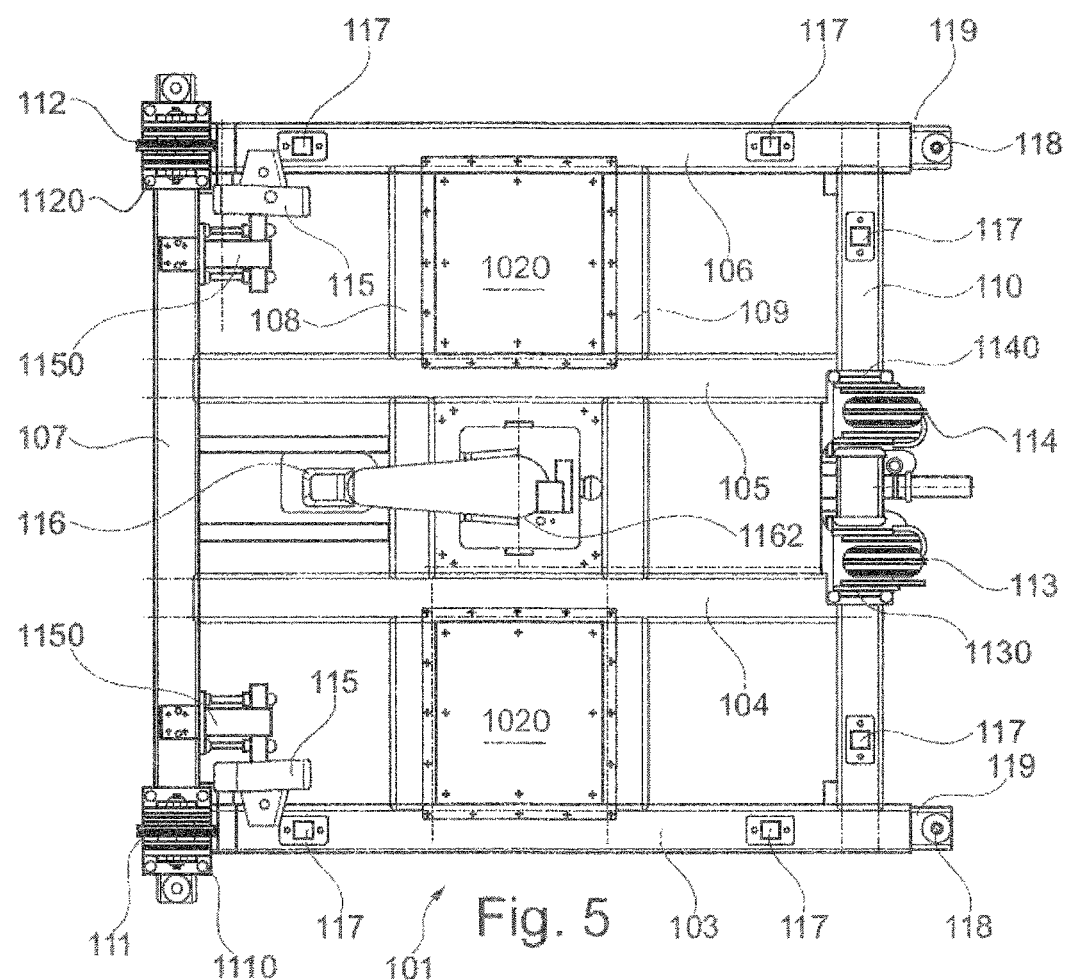
FIG. 5 shows in a bottom view the base frame with a triangular arrangement of wheels for the apparatus according to FIGS. 1-4.
Figure 6:
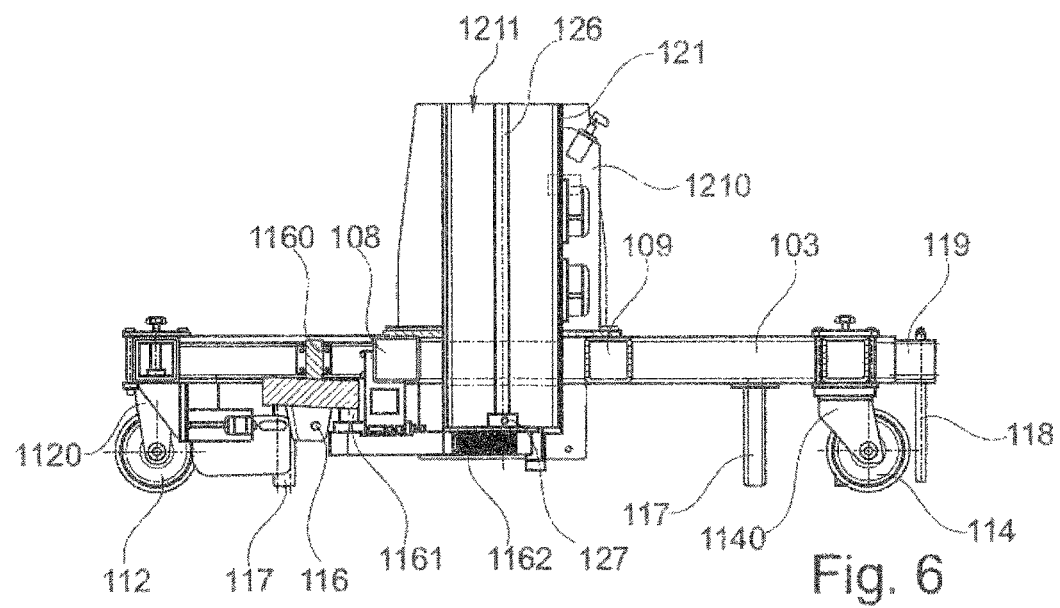
FIG. 6 shows a side view of the base frame according to FIG. 5.

The base frame 101 is now described in more detail with reference to FIGS. 5 and 6. The base frame 101 is a frame construction comprising a plurality of beams 103-105 intersected with a plurality of transverse beams 106-110 connected to one another to have a sturdy frame. On the top side of the base frame 101 may be arranged plates 1020 such that users may step onto the base frame 101. On said plates 1020 may also be arranged the sledge 151 for storing the apparatus 100 or different types of sledges 151 for different combustor types or mounting ports 12.

On the base frame 101 is also arranged a compartment 102 (cf. FIGS. 4, 10) for carrying batteries and at least one charger for the supply of the electrical motors 115, 116 or other equipment may be stored in said compartment 102. The compartment 102 has, however, also the effect of further stiffening the base frame 101.

In case of a hydraulic beam 120, valves/compressor or a hydraulic aggregate may also be stored in the compartment 102.

On the bottom side of the frame 101 are arranged the twin wheels 111-114. The wheels 111-114 may be arranged in the triangular arrangement of wheels 111-114. This arrangement is depicted in FIG. 5. The wheels 111-114 are hinged in wheel suspensions 1110-11140, respectively. The two left wheels in FIG. 5 are suspended in rigid wheel suspensions 1110, 1120, respectively. These rigid wheels 111, 112 are each driven by one electrical motor 115 that is attached to the base frame 101 in a motor suspension 1150. The wheels 113, 114 to the right in FIG. 5 are rotatable wheels that are hinged to the base frame 101 in rotatable wheel suspensions 1130, 1140, respectively.

Preferably, the motors 115, 116 have water and dustproof casings.

Moreover, the electric motor 116 is attached to the base frame 101 in a suspension 1160. Said electric motor 116 is configured for actuation the first spindle 126 in order to move the telescopic beam 120. Accordingly, the electric motor 116 comprises a driven axle 1161 which is coupled to a drive belt 1162. Instead of the belt 1162 also a gear may be employed. The spindle 126 is arranged in a cavity 1211 of the proximal stage module 121 and has at its proximal end a coupling 127 for coupling the spindle 126 to the drive axle 1161 by means of said drive belt 1162. Accordingly, the telescopic beam 120 may be actuated by means of said electric motor 116. The coupling 127 may also include a safety brake in case of failure of the motor 116 or of the motion transmission to the spindle 126.

Furthermore, the base frame 101 comprises support members 117 that are arranged on the base frame 101 to extend from the base frame 101 toward the ground 90 for further improving the stability of the apparatus 100 during clashes that may occur.

The mobile base frame 101 also comprises extendable support members 118 on slider beams 119. The slider beams 119 may be slid in or out of the longitudinal beams 103, 106 (to the right in FIG. 5) such that the slider beams 119 are moveable out of the frame 101 or back into the frame 101. The extendable support members 118 are arranged on free ends of the slider beams 119. Moreover, the extendable support members 118 are translatable to come into contact with the ground 90. Thereby, additional stability is gained. A shiftable length of the slider beams 119 may be 0.5 meter to 1.5 meters.

The support members 118 may also be translated away from the ground 90 such that the base frame 101 may be rolled on the ground 90 without the support member 118 touching the ground 90. Accordingly, the slider beams 119 may also stay in the extended position during movements of the base frame 101. For storing purposes, however, the slider beams 119 may be shiftable substantially entirely into the respective frame beam 103, 106.

Figure 10:
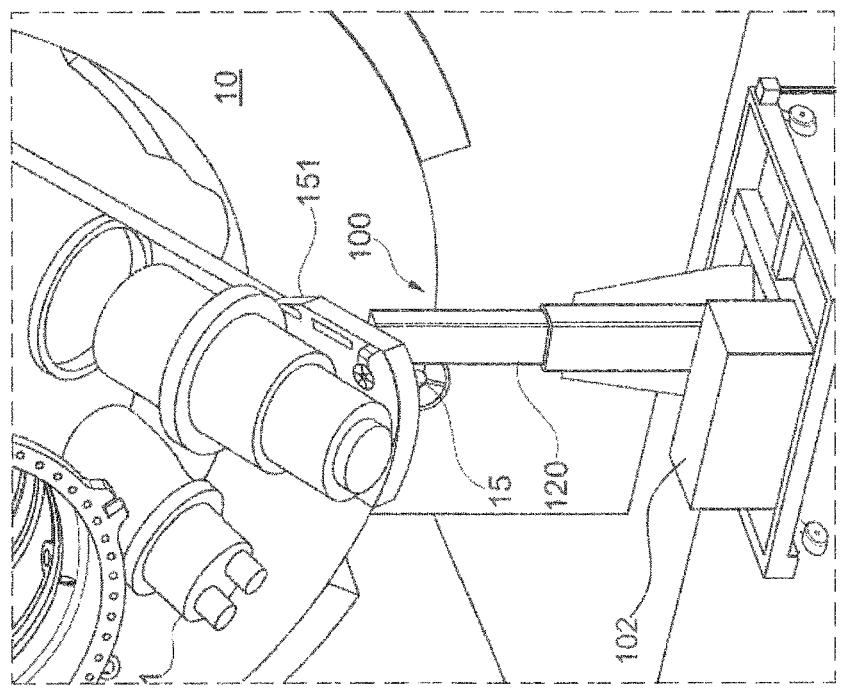
FIG. 10 shows the apparatus upon delivering the combustor to the mounting port of the gas turbine, the sledge being in a retracted position.

FIGS. 10 to 12 show how the combustor 1 is delivered to the mounting port 12 of the annular combustor assembly 13 of the gas turbine 10. FIG. 10 shows the apparatus 100 while delivering the combustor 1 to the mounting port 12 of the gas turbine 10. The apparatus 100 is placed under the mounting port 12; the beam 120 is extended to deliver said combustor 1, while the carriage 15 is properly inclined position and the sledge 151 is loaded with the combustor 1 and positioned in a retracted position. Then the sledge 151 is extended, the mechanisms 16, 17, 152 further used to adjust the combustor properly. After flanging the combustor 1 to the combustor assembly 13, the beam 120 is collapsed by actuation of the first spindle 126 (cf. FIG. 11). With a collapsed beam 120, the apparatus 100 is in park position and moved away from the service zone 11 (cf. FIG. 12).

Figure 13:
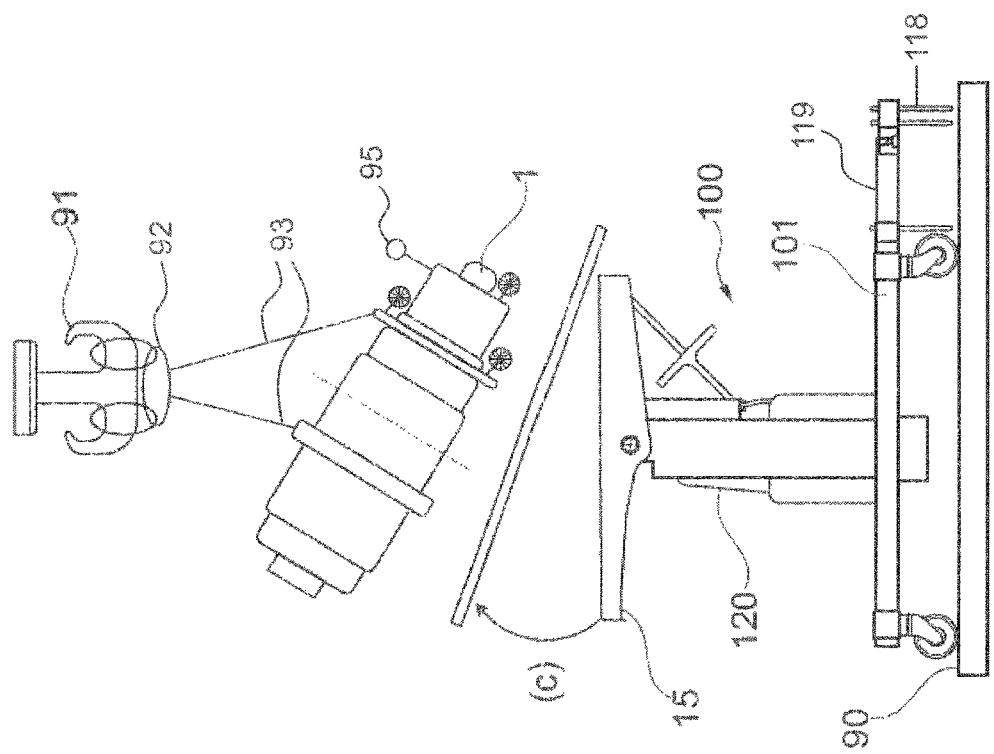
FIG. 13 shows how the combustor is loaded onto the carriage.

FIG. 13 shows how the combustor 1 may be loaded onto the carriage 15. The turbine part, here the combustor 1, is attached to a crane 91 by means of chain blocks 93 and one single sling 92. Already on the crane 91 the combustor 1 may be oriented properly with reference to the measurement devices 95, 96, whereupon apparatus 100 is placed on the ground 90 under the combustor 1 by means of the mobile base frame 101 and the carriage 15 is properly oriented by means of the telescopic beam 120 and the motion mechanisms 16, 17, 18, 152. Then the combustor 1 is received on the specifically for said combustor 1 designed sledge 151 and fastened thereon.

Figure 14:
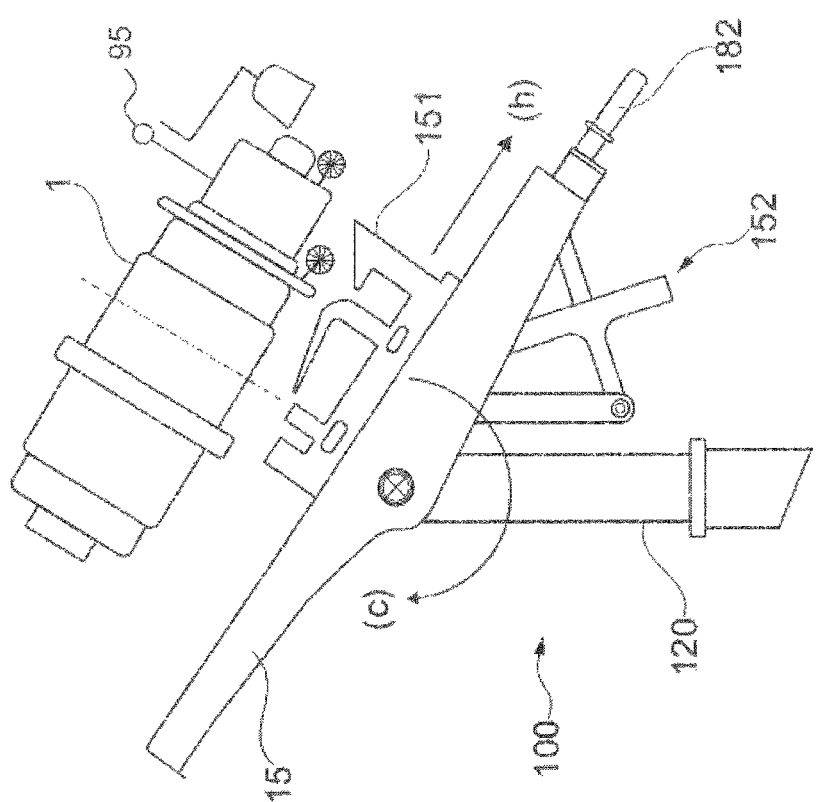
FIG. 14 shows the combustor set onto the sledge.

FIG. 14 shows the combustor 1 loaded onto the carriage 15 of the apparatus 100, ready for being delivered to the respective mounting port 12.

It is to be understood that any motor 115, 116, 182 described herein may be a standard electrical type, pneumatic, or hydraulic motor or the like. Moreover, any motor may be controlled by the control panel 1210 and/or by a remote control device, the latter being advantageous if the user wants to step away from apparatus 100 during operation, e.g., for space or safety reasons. The apparatus 100 may also be controlled by embedded remote controls. The remote controls frequency can be changed depending on the country rules.

Moreover, the apparatus 100 may be designed such that the beam 120, including spindle 126 and carriage 15, may be disassembled such that the apparatus 100 may be compactly stored or shipped.

Figures 15, 16:
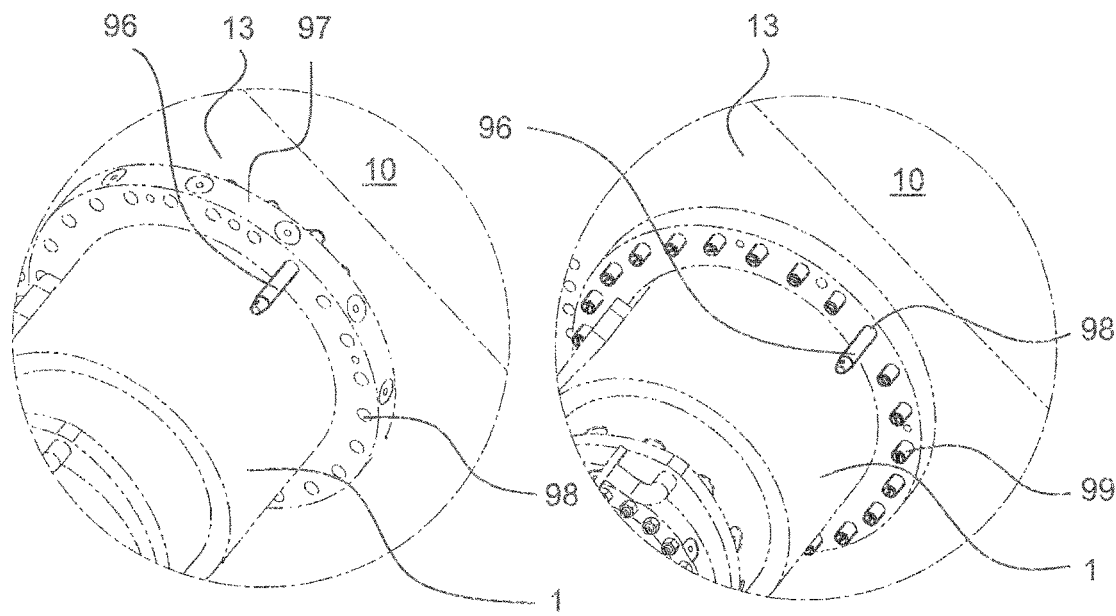
FIG. 15 shows a perspective view of the combustor approaching the final position, the combustor being guided by a guiding pin.
FIG. 16 shows a perspective view of the combustor in final position, with studs inserted into flange and with the guiding pins protruding over said flange.
Figure 17:
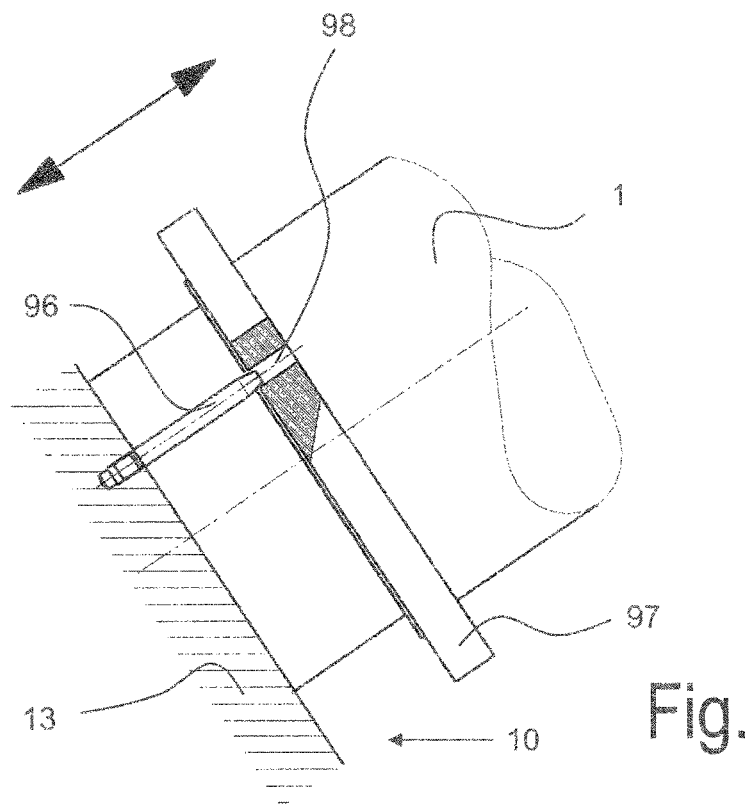
FIG. 17 shows a side view of the combustor approaching the final position.

FIG. 15 shows a perspective view of the combustor 1 approaching the final position in port 12, the combustor 1 being engaged with by its flange 97 to and guided by guiding pins 96. Preferably, the guiding pins 96 are attached on the annular combustor assembly 13 such that they protrude into diametrically spaced recesses 98 on a flange 97 of the combustor 1. FIG. 17 shows a side view of the combustor 1 approaching the final position. As can be seen, the pins 96 offer guidance and orientation help.

FIG. 16 shows a perspective view of the combustor 1 in final position, with studs 99 being inserted into the recesses 98, while the guiding pins 96 are still inserted in the assembly 13 and protrude over said flange 97. In a next step, the pins 96 may be removed and further studs 99 may be inserted to finally fasten the flange 97 and therefore the combustor 1 to the annular combustor assembly 13. One preferred embodiment of the method for moving a combustor 1 to a combustor assembly 13 of the gas turbine 10 may be as follows:

1. Unpack combustor 1, remove shipping covers and clean any rust inhibitor from exposed surfaces.
2. Attach two chain blocks 93 and one single sling 82, lift combustor 1 with a lifting device 91 and adjust combustor 1 according the double bubble level 95 (cf. FIG. 13).
3. Pre-adjust the sledge 151 angle along pivot motion (c) of the apparatus 100 to the value of the combustor 1 (cf. FIG. 13).
4. Lift combustor 1 onto the sledge 151 and secure the combustor 1 with two bolts (or a ratchet strap).
5. Drive apparatus 100 on ground 90 with combustor 1 into the service zone 11 and into enclosure underneath the gas turbine 10, position it in the desired location.
6. Extend telescopic beam 120 and bring combustor 1 into the vicinity of the mounting port 12.
7. Start inserting the sledge 151 loaded with the combustor 1 into the mounting port 12 by means of first shifting mechanism 18 along the translational motion (h) parallel the longitudinal axis L of the carriage 15.
8. Stop 300 millimeters before the final position, install two guide pins 96; fine adjust can vertically, laterally, and radially.
9. Gently shift combustor 1 further into the casing or the gas turbine 1, monitor inner seal rings and stop once engaged in the spigot fit.
10. Install all threaded studs, install all hex nuts and hand tighten two across with a wrench.
11. Replace the two guide pins 96 with studs 99 and nuts.
12. Loosen and remove the two bolts or the ratchet from the sledge 151.
13. Slide the sledge 151 back, lower beam 120 and drive mobile frame 101 out of the service zone 11 of the turbine 1.
14. Tighten the bolts of the combustor 1 on the turbine casing with the hydraulic torque wrench.
15. Connect fuel lines, instrumentation and apply insulation.

The procedure for removing the combustor 1 is just the backwards procedure as outlined above.

Accordingly, the present invention therefore provides a tool for efficient movement of turbine parts which may shorten down-times of the gas turbine 10.

| LIST OF REFERENCE SIGNS | |
| --- | --- |
| 1 | combustor of 10 |
| 10 | industrial gas turbine |
| 11 | service area of 10 |
| 12 | combustor mounting port on 10 |
| 13 | annular combustor assembly with a plurality of ports 12 |
| 100 | turbine part replacing apparatus |
| 101 | mobile base frame |
| 102 | compartment |
| 1020 | plate |
| 103-110 | beam of 101 |
| 111, 112 | driven, rigid wheel |
| 1110, 1120 | rigid wheel suspension |
| 113, 114 | rotatable wheel |
| 1130, 1140 | rotatable wheel suspension |
| 115 | electric motor for 111, 112 |
| 1150 | suspension of 115 |
| 116 | electric motor |
| 1160 | suspension of 116 |
| 1161 | driven axle of 116 |
| 1162 | drive belt for 126 |
| 117 | support member |
| 118 | extendable support member |
| 119 | slider beam for 118 |
| 120 | telescopic beam |
| 121 | first stage of 120 |
| 1210 | control panel |

-continued

LIST OF REFERENCE SIGNS

| | |
|---|---|
| 1211 | cavity in 121 |
| 122 | second stage of 120 |
| 123 | third stage of 120 |
| 124 | fourth stage of 120 |
| 1241 | recess in 124 |
| 126 | first spindle for telescoping 120 along (a) |
| 127 | coupling between 126 and 1162 |
| 128 | reinforcing rips |
| 15 | carriage of 100 |
| 150 | outer wall of 15 |
| 151 | sledge on 150 |
| 152 | first pivoting mechanism for pivoting sledge 15 about (c) |
| 1520, 1525 | threaded rod |
| 1521, 1524 | threaded cylinder |
| 1522 | hand actuator |
| 1523 | chain actuator |
| 1526 | bracket |
| 153 | concave top wall of 150 |
| 154 | recess in 15 |
| 16 | second sliding mechanism for pivoting 151 about (e) |
| 161 | screw of 16 |
| 162 | engagement member of 16 |
| 163 | recess in 162 |
| 164 | protruding bolt of 161 |
| 165 | bearing element of 16 |
| 17 | third sliding mechanism for sliding motion of 151 along (d) |
| 171 | screw of 17 |
| 172 | threaded sleeve of 17 |
| 173 | tapered ends of 171 |
| 174 | plate |
| 175 | disk |
| 18 | first sliding mechanism for sliding motion of 151 along (h) |
| 181 | second spindle |
| 182 | motor for 181 |
| 183 | thrust block on 181 |
| 90 | ground |
| 91 | crane |
| 92 | sling |
| 93 | chain block |
| 95 | double bubble |
| 96 | guide pin |
| 97 | flange |
| 98 | opening/recess |
| 99 | stud |
| a | vertical motion of 15,120 |
| b | rotational motion of 100 about 120 |
| c | first pivot motion of 15 about an axis perpendicular to L and to V |
| d | third sliding motion direction of 15 |
| e | second sliding motion, second pivot motion of 15 about an axis parallel to L |
| f | rotational motion of 111 |
| g | translational motion of 100 |
| h | first sliding movement direction of 15 |
| L | longitudinal axis of 15 |
| V | general vertical direction |
| H | general horizontal direction |

The invention claimed is:

1. Turbine part replacing apparatus for moving a combustor and/or a sequential liner of an industrial gas turbine relative to a mounting port of the gas turbine, the apparatus comprising:
a mobile frame with a moving mechanism for substantially horizontal translation motion;
a vertically extendable arm attached to and extending from said mobile frame;
a carriage attached to said extendable arm such that the carriage is moveable vertically with respect to the mobile frame when a moving operation is to be performed; and
a measurement device configured to measure a rotational position of the carriage,
wherein the turbine part replacing apparatus is configured for receiving a combustor and/or a sequential liner in said carriage and for vertically moving the combustor and/or the sequential liner by said extendable arm relative to said mounting port.

2. Turbine part replacing apparatus according to claim 1, wherein said extendable arm is a telescopic beam moveable along a vertical motion.

3. Turbine part replacing apparatus according to claim 1, wherein said extendable arm comprises:
at least one first spindle for actuating said extendable arm to vertically move a carriage, wherein said extendable arm and said first spindle have a three stage, four stage or five stage design and/or wherein said extendable arm is configured to move over a vertical distance of at least 1.5 meters.

4. Turbine part replacing apparatus according to claim 1, wherein the carriage comprises:
a first pivoting mechanism, wherein the carriage is attached to the extendable arm such as to be pivotable along a first pivot motion about a first pivot axis by said first pivot mechanism, the first pivot axis extending horizontally and perpendicular to a longitudinal direction (L) of the carriage.

5. Turbine part replacing apparatus according to claim 4, wherein a first surface of the carriage is concave such that a sliding motion of a sledge on the first surface perpendicular to the longitudinal direction (L) of the carriage is a second pivot motion about a second pivot axis parallel to the longitudinal direction (L) of the carriage, wherein the sliding device comprises:
a second sliding mechanism configured for shifting said carriage on the first surface along the second pivot motion.

6. Turbine part replacing apparatus according to claim 1, wherein the carriage comprises:
a sledge for placement of a combustor on the carriage, the sledge being arranged on a first surface of the carriage through a sliding device such that the sledge is moveable in a sliding motion relative to said carriage along a longitudinal direction (L) of the carriage and/or perpendicularly to the longitudinal direction (L) of the carriage.

7. Turbine part replacing apparatus according to claim 6, wherein said sliding device comprises:
a first sliding mechanism with at least one second spindle and a thrust block, said thrust block being translatable along the second spindle and being attached to the sledge such that the sledge is moveable along a translation motion parallel to said second spindle along the longitudinal direction (L) of the carriage.

8. Turbine part replacing apparatus according to claim 1, wherein the carriage comprises:
a third sliding mechanism, wherein the carriage is attached to the extendable arm such as to be translatable in a translation motion along an axis extending horizontally and perpendicularly to a longitudinal direction (L) of the carriage.

9. Turbine part replacing apparatus according to claim 1, wherein the measurement device is configured to measure rotational position about two horizontal rotational axes that are oriented angularly to one another, and the measurement device comprises:
 a double bubble level.

10. Turbine part replacing apparatus according to claim 1, wherein the mobile frame comprises:
 rolling members for rolling on a surface external to the turbine part replacing apparatus.

11. Turbine part replacing apparatus according to claim 10, wherein said rolling members are at least three or more wheels, and wherein said wheels are arranged in a triangular or in a rectangular arrangement.

12. Turbine part replacing apparatus according to claim 11, wherein at least one wheel is rotatable about a vertical rotation axis.

13. Turbine part replacing apparatus according to claim 11, wherein all wheels are rotatable about a vertical rotation axis.

14. Turbine part replacing apparatus according to claim 1, wherein said extendable arm comprises:
 at least one first spindle for actuating said extendable arm to vertically move a carriage, wherein said extendable arm and said first spindle have a three stage, four stage or five stage design and/or wherein said extendable arm is configured to move over a vertical distance of at least 10 meters.

15. Turbine part replacing apparatus according to claim 1, in combination with an industrial gas turbine, the industrial gas turbine comprising:
 a combustor and/or a sequential liner.

16. Kit of parts comprising:
 a turbine part replacing apparatus and at least a portion of a carriage, the kit of parts being selected to allow, depending on a location of a mounting port on a gas turbine and/or a turbine part to be moved, the turbine part replacing apparatus and the carriage to be assembled with a specified configuration, wherein the specified configuration includes at least a rotational position of the carriage that is determined by a measuring device.

17. Method of moving a combustor and/or sequential liner of an industrial gas turbine relative to a mounting port of the gas turbine, the method comprising:
 determining an absolute attachment position of the combustor and/or sequential liner on said gas turbine; and
 moving said combustor and/or sequential liner using a turbine part replacing apparatus, the turbine part replacing apparatus including:
  a mobile frame with a moving mechanism for substantially horizontal translation motion;
  a vertically extendable arm attached to and extending from said mobile frame;
  a carriage attached to said extendable arm such that the carriage is moveable vertically with respect to the mobile frame when a moving operation is to be performed; and
  a measurement device configured to measure a rotational position of the carriage, wherein the turbine part replacing apparatus is configured for receiving a combustor and/or a sequential liner in said carriage and for vertically moving the combustor and/or the sequential liner by said extendable arm relative to said mounting port.

18. Method according to claim 17, comprising:
determining the absolute attachment position of the combustor and/or liner by a measurement device;
measuring rotational position, using the measurement device, about two horizontal rotational axes that are oriented angularly to one another, the measurement device being a double bubble level, wherein at least one guide pin is arranged on the combustor and/or line or on a casing of the gas turbine for reception in corresponding slots in the casing of the gas turbine or in the combustor and/or liner, the at least one guide pin being a guiding and/or measurement device for measuring the rotational position with respect to a vertical axis.

* * * * *